(12) United States Patent

Bonnet et al.

(10) Patent No.: US 12,583,950 B2

(45) Date of Patent: Mar. 24, 2026

(54) METHOD FOR MAKING HIGHLY CRYSTALLINE AND THERMALLY STABLE VINYLIDENE FLUORIDE-BASED POLYMERS

(71) Applicants: ARKEMA FRANCE, Colombes (FR); CENTRE NATIONAL DE LA RECHERCHE SCIENTIFIQUE, Paris (FR); UNIVERSITE DE MONTPELLIER, Montpellier (FR); ECOLE NATIONALE SUPERIEURE DE CHIMIE DE MONTPELLIER, Montpellier (FR)

(72) Inventors: Anthony Bonnet, Colombes (FR); Samuel Devisme, Serquigny (FR); Bruno Ameduri, Montpellier (FR); Nadim Eid, Montpellier (FR)

(73) Assignees: ARKEMA FRANCE, Colombes (FR); CENTRE NATIONAL DE LA RECHERCHE SCIENTIFIQUE, Paris (FR); UNIVERSITE DE MONTPELLIER, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 663 days.

(21) Appl. No.: 17/998,797

(22) PCT Filed: May 14, 2021

(86) PCT No.: PCT/EP2021/062887

§ 371 (c)(1),
(2) Date: Nov. 14, 2022

(87) PCT Pub. No.: WO2021/229081

PCT Pub. Date: Nov. 18, 2021

(65) Prior Publication Data

US 2023/0203213 A1 Jun. 29, 2023

(30) Foreign Application Priority Data

May 15, 2020 (FR) ...................................... 2004832

(51) Int. Cl.
| | |
|---|---|
| *C08F 14/22* | (2006.01) |
| *C08F 4/46* | (2006.01) |
| *C08F 14/28* | (2006.01) |
| *C08F 16/24* | (2006.01) |

(52) U.S. Cl.
CPC .............. *C08F 14/22* (2013.01); *C08F 4/463* (2013.01); *C08F 14/28* (2013.01); *C08F 16/24* (2013.01)

(58) Field of Classification Search
USPC ................................................ 526/255, 915
See application file for complete search history.

(56) References Cited

U.S. PATENT DOCUMENTS

| | | | |
|---|---|---|---|
| 5,285,002 A | 2/1994 | Grootaert | |
| 5,378,782 A | 1/1995 | Grootaert | |
| 5,623,038 A * | 4/1997 | Greuel ................... | C08F 214/18 |
| | | | 526/249 |
| 5,639,837 A | 6/1997 | Farnham et al. | |
| 5,852,149 A | 12/1998 | Abusleme et al. | |
| 6,462,228 B1 | 10/2002 | Dams | |
| 7,754,810 B2 | 7/2010 | Coughlin et al. | |
| 10,093,761 B2 | 10/2018 | Dahlke et al. | |
| 2002/0198334 A1 | 12/2002 | Kaspar et al. | |
| 2009/0124755 A1 | 5/2009 | Coughlin et al. | |
| 2014/0005333 A1 | 1/2014 | Fukushi et al. | |

FOREIGN PATENT DOCUMENTS

| | | |
|---|---|---|
| CN | 1119870 A | 4/1996 |
| CN | 1189169 A | 7/1998 |
| CN | 103347842 A | 10/2013 |
| JP | H08508062 A | 8/1996 |
| JP | H08301940 A | 11/1996 |
| JP | H11509244 A | 8/1999 |
| WO | 9702300 A1 | 1/1997 |

OTHER PUBLICATIONS

Patil, et al., "Novel Method to Assess the Molecular Weights of Fluoropolymers by Radical Copolymerization of Vinylidene Fluoride with Various Fluorinated Comonomers Initiated by a Persistent Radical," Macromolecules, 2013, 46, 3092-3106. (Year: 2013).*

Ameduri, B. et al., "First MALDI-TOF Mass Spectrometry of Vinylidene Fluoride Telomers Endowed with Low Defect Chaining," Macromolecules, vol. 37, No. 20, Aug. 28, 2004, 8 pages.

Boschet, F. et al., "Novel Source of Trifluoromethyl Radical As Efficient Initiator for the Polymerization of Vinylidene Fluoride," Macromolecular Rapid Communications, vol. 33, No. 4, Jan. 18, 2012, 7 pages.

France National Institute of Industrial Property, Search Report Issued in Application No. FR2004832, Nov. 11, 2020, 8 pages.

ISA European Patent Office, International Search Report Issued in Application No. PCT/EP2021/062887, Aug. 19, 2021, WIPO, 4 pages.

(Continued)

*Primary Examiner* — Fred M Teskin

(74) *Attorney, Agent, or Firm* — Alleman Hall LLP

(57) ABSTRACT

The invention relates to a method of polymerizing at least one monomer comprising a vinylidene fluoride monomer, the method comprising putting in contact the at least one monomer with a polymerization initiator and an oxidizing agent, the polymerization initiator having the formula (I):

$$(R_fSO_2^-)_xM^{x+} \qquad \text{(II)}$$

wherein $R_f$ is a fluoroalkyl group comprising from 1 to 3 carbon atoms; and $M^{x+}$ is chosen from a monovalent cation, or a divalent cation, or a trivalent cation, or a tetravalent cation.

14 Claims, 3 Drawing Sheets

(56) References Cited

OTHER PUBLICATIONS

Morales-Cerrada, R. et al., "Fluoroalkyl Pentacarbonylmanganese(I) Complexes as Initiators for the Radical (co) Polymerization of Fluoromonomers," Polymers, vol. 12, No. 2, Feb. 8, 2020, 17 pages.

Japan Patent Office, Office Action Issued in Application No. 2022-569130, May 7, 2025, 13 pages.

China National Intellectual Property Administration, Office Action and Search Report Issued in Application No. 202180035214.0, Jul. 15, 2023, 12 pages.

* cited by examiner

METHOD FOR MAKING HIGHLY CRYSTALLINE AND THERMALLY STABLE VINYLIDENE FLUORIDE-BASED POLYMERS

TECHNICAL FIELD

The present invention relates to a method for polymerizing vinylidene fluoride and optionally further monomers. The invention also relates to a polymer obtained with said method and comprising at least one terminal fluoroalkyl group.

TECHNICAL BACKGROUND

Fluorinated polymers are high value-added materials, due to their unique properties such as thermal stability, chemical inertness (to solvents, oils, water, acids and bases), low values of the refractive index, permittivity, dissipation factor, and water absorption as well as excellent weather durability and resistance to oxidation. Hence, they can be applied in many fields such as aeronautics, microelectronics, engineering, chemical industry, optics, textile finishing, automobile industry, and wiring insulation.

Among these polymers, those containing vinylidene fluoride are of particular importance because they can be used in a wide range of applications from piezoelectric materials to water treatment, and lithium ion batteries.

Generally, such polymers can be prepared via an emulsion polymerization process in water using a fluorinated or non-fluorinated surfactant and a persulfate initiator. Despite the efficiency of this process, the use of surfactants such as ammonium perfluorooctanoate, perfluorooctanoic acid, and perfluorooctanesulfonic acid, leads to bioaccumulation, toxicity, and persistence issues.

In addition, the nature of the end chain functionality seems to be a crucial factor that affects the polymers thermal stability. For example, when ammonium, potassium or sodium persulfate is used as a polymerization initiator, the resulting polymer, bearing sulfonate end-groups, has low thermal stability and may decompose from such end groups.

Furthermore, polymers deriving from the polymerization of vinylidene fluoride tend to have a low crystallinity which makes them soluble in solvents such as acetone, dimethyl formamide or dimethyl sulfoxide.

Document US 2009/0124755 relates to an emulsion polymerization process for the production of fluoropolymers that contain polymerized units of tetrafluoroethylene wherein a perfluoroaliphatic sulfinate is employed as a dispersant.

Document U.S. Pat. No. 5,285,002 discloses fluoroalkyl sulfinates used as a source of fluoroalkyl radicals in aqueous emulsion polymerization.

The article "*First MALDI-TOF Mass Spectrometry of Vinylidene Fluoride Telomers Endowed with Low Defect Chaining*" (Macromolecules, 2004, 37, p. 7602) relates to the radical telomerization of vinylidene fluoride with iodotrifluoromethane initiated by tert-butyl peroxypivalate, during which telomers of low molecular weight were produced.

The article "*Novel source of trifluoromethyl radical as efficient initiator for the polymerization of vinylidene fluoride*" (Macromolecular Rapid Communications, 2012, 33, p. 302) describes the radical polymerization of vinylidene fluoride by using a persistent perfluoroalkyl radical (perfluoro-3-ethyl-2,4-dimethyl-3-pentyl) as an initiator.

The article "*Visible-Light hypervalent iodide carboxylate photo(trifluoro)methylations and controlled radical polym-*

*erization of fluorinated alkenes*" (Angew. Chem. Int. Ed. 2013, 52, p. 10027) teaches the radical polymerization of vinylidene fluoride by using hypervalent fluorinated compounds as initiators.

The article "*Fluoroalkyl pentacarbonylmanganese(I) complexes as initiators for the radical (co)polymerization of fluoromonomers*" (Polymers, 2020, 12, 384) relates to the use of pentacarbonylmanganese(I) complexes to initiate the radical polymerization of vinylidene fluoride.

Document U.S. Pat. No. 5,639,837 discloses a process in which fluorine containing olefins are polymerized using an initiation system which is a combination of a fluoroaliphatic sulfinate or sulfinic acid and chlorate, bromate or hypochlorite ions.

Document U.S. Pat. No. 7,754,810 relates to an emulsion process for the production of fluoropolymers wherein a combination of at least two fluorosurfactants is employed as a dispersant and wherein at least fluorosurfactant is a perfluoroalkoxy or perfluoroalkyl sulfinate.

Document U.S. Ser. No. 10/093,761 is directed to a fluorine-containing polymer derived from the polymerization of a monomer and a sulfinate-containing molecule.

Document US2014005333 relates to microemulsions obtained by mixing water, at least one ethylenically unsaturated fluoromonomer and at least one oligomeric fluorosulfinic compound and/or at least one ethylenically unsaturated polymerizable monomeric fluorosulfinic compound.

There is still a need for a method for the preparation of polymers comprising vinylidene fluoride monomers, which makes it possible to obtain polymers having high thermal stability and high crystallinity, wherein the method does not give rise to toxicity issues.

SUMMARY OF THE INVENTION

It is a first object of the invention to provide a method of polymerizing at least one monomer comprising a vinylidene fluoride monomer, the method comprising putting in contact the at least one monomer with a polymerization initiator and an oxidizing agent, the polymerization initiator having the formula (I):

$$(R_f SO_2^-)_x M^{x+} \tag{I}$$

wherein:

$R_f$ is a fluoroalkyl group comprising from 1 to 3 carbon atoms; and $M^{x+}$ is chosen from a monovalent cation, or a divalent cation, or a trivalent cation, or a tetravalent cation.

According to some embodiments, $R_f$ is a fluoroalkyl group comprising one carbon atom, and preferably $R_f$ is a trifluoromethyl group.

According to some embodiments, $M^{x+}$ is chosen from $Li^+$, $Na^+$, $K^+$, $NH_4^+$, $Mg^{2+}$, $Ca^{2+}$, $Zn^{2+}$, $Fe^{2+}$, $Co^{2+}$, $Pb^{2+}$, $Fe^{3+}$ and $Al^{3+}$, and preferably chosen from $Li^+$, $Na^+$, $K^+$ and $NH_4^+$.

According to some embodiments, x is 1 or 2, and preferably wherein x is 1.

According to some embodiments, the oxidizing agent is chosen from a peroxide compound, a persulfate compound, dioxygen and a halogen oxide, and preferably the oxidizing agent is a persulfate compound chosen from ammonium persulfate, potassium persulfate and sodium persulfate.

According to some embodiments, the at least one monomer further comprises at least one comonomer chosen from: a fluorinated comonomer other than vinylidene fluoride comprising an ethylene bond, a styrene comonomer, a methacrylic comonomer, an acrylic comonomer and combinations thereof.

According to some embodiments, the fluorinated comonomer other than vinylidene fluoride comprising an ethylene bond is chosen from: trifluoroethylene, vinyl fluoride, tetrafluoroethylene, hexafluoropropylene, hexafluorobutadiene, chlorotrifluoroethylene, bromotrifluoroethylene, perfluoropropylvinylether, perfluoromethylvinylether, 2,3,3, 3-tetrafluoropropene, 2-trifluoromethacrylic acid, alkyl 2-trifluoromethacrylate, $\alpha,\beta$-difluoroacrylic acid, alkyl $\alpha,\beta$-difluoroacrylate, $\beta,\beta$-difluoroacrylic acid, alkyl $\beta,\beta$-difluoroacrylate, $\alpha,\beta,\beta$-trifluoroacrylic acid, alkyl $\alpha,\beta,\beta$-trifluoroacrylate, 1,1,1-trifluoro-2-trifluoromethyl-prop-2-ene, perfluorobutadiene and their combinations.

According to some embodiments, the method comprises a first step of putting the oxidizing agent in contact with the polymerization initiator to form a mixture and a second step of putting this mixture in contact with the monomer(s).

According to some embodiments, the polymerization is carried out at a temperature from 40 to 100° C., and preferably from 50 to 75° C.

According to some embodiments, the polymerization is carried out in the absence of a surfactant.

It is a second object of the invention to provide a polymer comprising vinylidene fluoride units and at least partially comprising a terminal group $R_f$ wherein $R_f$ is a fluoroalkyl group comprising from 1 to 3 carbon atoms, the polymer having an average molecular weight (Mn) equal to or higher than 10 000 g/mol, preferably equal to or higher than 20 000 g/mol, and more higher than 30 000 g/mol.

According to some embodiments, the polymer is obtainable by the above method.

The present invention makes it possible to overcome the drawbacks of the prior art. In particular the invention provides a method for the preparation of polymers comprising vinylidene fluoride units having high thermal stability and high crystallinity, wherein the method does not give rise to toxicity issues.

This is achieved by the method according to the present invention. More particularly, this is achieved by the use of the polymerization initiator of formula (I) (in combination with the oxidizing agent), which due to the nature of the strong C—F bond, makes it possible to increase the thermal stability of the polymer.

In addition, the use of such polymerization initiator comprising a specific fluoroalkyl $R_f$ group makes it possible to substantially avoid toxicity issues (which could be observed for example with fluoroalkyl groups comprising a larger number of carbon atoms, which are believed to be more toxic and to lead to bioaccumulation and persistence issues).

Advantageously, the absence of surfactants, notably fluorinated surfactants, makes it possible to avoid high persistence, toxicity, and bioaccumulation issues.

Still advantageously, the presence of an oxidizing agent makes it possible to carry out the polymerization process at a relatively low temperature. In other words, due to the oxidizing agent, the generation of the perfluoroalkyl radical can be achieved at a lower temperature. Furthermore, the fact that the polymerization process can be carried out at a relatively low temperature allows to increase the crystallinity of the polymer and therefore decrease its solubility in solvents such as acetone, dimethyl formamide, N-methyl pyrrolidone, or dimethyl sulfoxide. More particularly, the lower temperature allows to regulate the head/tail configuration of the polymer. In a regular macromolecule all monomer units are normally linked in a head to tail configuration.

It has been found that, for PVDF, head-to-head or tail-to-tail inversion tends to decrease the crystallinity of the polymer. The polymerization method of the present invention makes it possible to decrease the inversion rate, which thus allows to obtain highly crystalline polymers.

DESCRIPTION OF EMBODIMENTS

Figure 1:
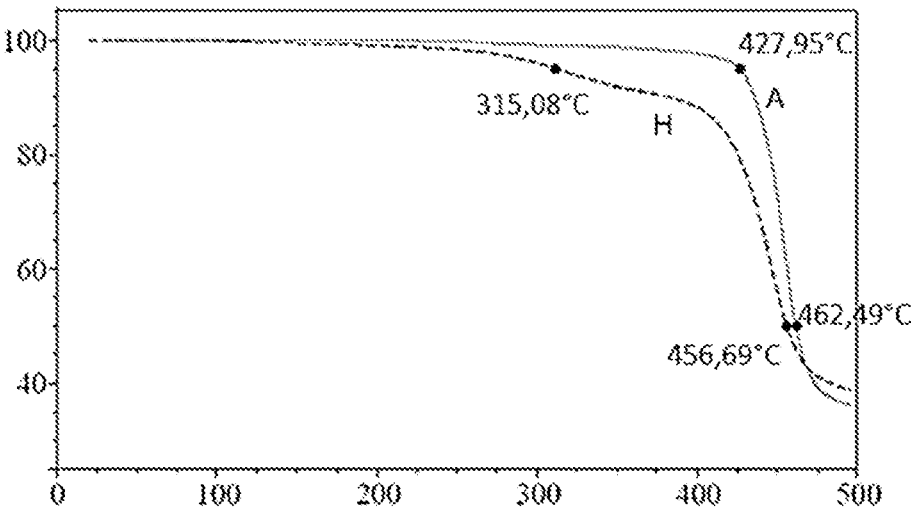
FIG. 1 illustrates two TGA thermograms. The weight of the polymer (%) can be read on the Y-axis and the temperature (° C.) can be read on the X-axis.

The invention will now be described in more detail without limitation in the following description.

Polymerization Method

The method according to the present invention is used for the polymerization of at least one monomer, comprising a vinylidene fluoride (VDF) monomer.

According to some embodiments, the method according to the invention is used to polymerize only vinylidene fluoride monomer, in order to obtain a PVDF homopolymer.

According to other embodiments, the invention is used to polymerize not only VDF monomer but also at least one other comonomer chosen from: a fluorinated comonomer comprising an ethylene bond and from non-fluorinated comonomers such as a styrene comonomer, a (meth)acrylic comonomer, and their combinations. In this case, the method according to the invention leads to a VDF copolymer. By "copolymer" is meant a polymer comprising units deriving from at least two different monomers. Thus, terpolymers are also included in the above definition. The term "(meth)acrylic" includes the terms acrylic and methacrylic.

The fluorinated comonomer (other than the VDF monomer) comprises an ethylene bond which can be polymerized. By "fluorinated monomer" is meant a monomer comprising at least one fluorine atom or a trifluoromethyl group.

This comonomer can be chosen from vinyl fluoride (VF), trifluoroethylene (TrFE), tetrafluoroethylene (TFE), hexafluoropropylene (HFP), hexafluorobutadiene, trifluoropropenes such as 3,3,3-trifluoropropene, tetrafluoropropenes such as 2,3,3,3-tetrafluoropropene (HFO-1234yf) or 1,3,3, 3-tetrafluoropropene (HFO-1234ze), 1,1,1-trifluoro-2-trifluoromethyl-prop-2-ene (hexafluoroisobutylene, HFIB), perfluorobutylethylene, pentafluoropropenes such as 1,1,3, 3-pentafluoropropene or 1,2,3,3,3-pentafluoropropene, perfluoroalkylvinylethers such as perfluoropropylvinylether (PPVE) and perfluoromethylvinylether (PMVE), 2-trifluoromethacrylic acid (MAF), alkyl 2-trifluoromethacrylate, $\alpha,\beta$-difluoroacrylic acid, alkyl $\alpha,\beta$-difluoroacrylate, $\beta,\beta$-difluoroacrylic acid, alkyl $\beta,\beta$-difluoroacrylate, $\alpha,\beta$, $\beta$-trifluoroacrylic acid, alkyl $\alpha,\beta$, $\beta$-trifluoroacrylate, and their combinations.

Optionally, the fluorinated comonomer can also comprise other halogens (other than fluorine) such as chlorine, bromine, and iodine. Such fluorinated comonomers can be chosen from iodotrifluoroethylene (ITFE), bromotrifluoroethylene (BrTFE), chlorofluoroethylene (CFE), chlorotrifluoroethylene (CTFE) and chlorotrifluoropropene. Chlorofluoroethylene can be either 1-chloro-1-fluoroethylene, or 1-chloro-2-fluoroethylene (Z and E). Chlorotrifluoropropene can be either 1-chloro-3,3,3-trifluoropropene or 2-chloro-3,3,3-trifluoropropene.

More preferably, the fluorinated comonomer can be chosen from trifluoroethylene, vinyl fluoride, tetrafluoroethylene, hexafluoropropylene, hexafluorobutadiene, chlorotrifluoroethylene, bromotrifluoroethylene, perfluoropropylvinylether, perfluoromethylvinylether, 1,1,1-trifluoro-2-trifluoromethyl-prop-2-ene, 2,3,3,3-tetrafluoropropene, 2-trifluoromethacrylic acid, alkyl 2-trifluoromethacrylate, $\alpha,\beta$-difluoroacrylic acid, alkyl $\alpha,\beta$-difluoroacrylate, $\beta,\beta$-difluoroacrylic acid, alkyl $\beta,\beta$-difluoroacrylate, $\alpha,\beta$, $\beta$-trifluoroacrylic acid, alkyl $\alpha,\beta$, $\beta$-trifluoroacrylate, perfluorobutadiene, as well as their combinations.

The non-fluorinated styrene comonomer can be chosen from styrene, $\alpha$-methyl styrene, $\beta$-methyl styrene (2 or 3 or 4 and combinations thereof), acetoxystyrene, benzhydrylstyrene, styrene halide (iodo, chloro, bromo), alkoxy styrenes, (alkyl/aryl phosphino) styrenes, vinyl acetate, vinyl benzoate, vinyl benzoic acid salts.

The non-fluorinated (meth)acrylic comonomer can be chosen for example from (meth)acrylic acid, (meth)acrylamides, (meth)acrylonitriles, (meth)acrylates, as well as their combinations. Such monomer can be chosen also (meth)acrylic acid, (meth)acrylate monomers having an alkyl group preferably from 1 to 22 carbon atoms, saturated or unsaturated, linear, branched or cyclic which can comprise at least one heteroatom (O, S).

Examples of non-fluorinated (meth)acrylic comonomers include (meth)acrylic acid, methyl (meth)acrylate, ethyl (meth)acrylate, n-propyl (meth)acrylate, isopropyl (meth)acrylate, allyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, 2-ethylhexyl (meth)acrylate, n-decyl (meth)acrylate, isodecyl (meth)acrylate, lauryl (meth)acrylate, tridecyl (meth)acrylate, C12-C14 alkyl (meth)acrylate, n-octadecyle (meth)acrylate, C16-C18 alkyl (meth)acrylate, cyclohexyl (meth)acrylate, t-butyl cyclohexyl (meth)acrylate, 3,3,5-trimethyl cyclohexyl (meth)acrylate, isobornyl (meth)acrylate, glycidyl methacrylate, benzyl methacrylate, 3-sulfopropyl methacrylate potassium salt, methacroylcholine chloride, 3-(trimethoxysilyl)propyl methacrylate, 2,2,6,6-tetramethyl4-piperidyl methacrylate, 2-[2-hydroxy-5-[2-(methacryloyloxy)-ethyl]phenyl]-2H-benzotriazole, polyethylene glycol diacrylate, bisphenol A dimethacrylate, mono-bis(2-acryloyloxyethyl) succinate, pentaerythritol tetraacrylate, 1,3,5-triacryloylhexahydro-1,3,5-triazine, trimethylolpropane trimethacrylate, tris(2-acryloyloxyethyl) isocyanurate and combinations thereof.

Particularly preferred compounds are methyl (meth)acrylate, ethyl (meth)acrylate, butyl (meth)acrylate, 2-ethylhexyl (meth)acrylate.

Further possible other comonomers include alkyl vinyl phosphonates, vinyl phosphonic acid, vinyl ketones, isoprene, butadiene, vinyl imidazoles, alkyl vinyl ammonium halides, vinyl carbazoles, vinyl pyrrolidones, vinyl sulfonates salts, vinylferrocenes, vinyl phthalimides, vinyl caprolactames, vinyl pyridines, vinyl silanes, vinyl siloxanes and combinations thereof.

In case the polymerization method is used to also polymerize comonomers other than VDF, the molar ratio of VDF monomers to the other comonomers can be from 0.01 to 99%, and preferably from 0.1 to 50 For example, this ratio may be from 0.01 to 1; or from 1 to 5; or from 5 to 10; or from 10 to 20; or from 20 to 30; or from 30 to 40; or from 40 to 50; or from 50 to 60; or from 60 to 70; or from 70 to 80; or from 80 to 90; or from 90 to 99.

The above monomers are put in contact with a polymerization initiator and an oxidizing agent. Thus, the oxidizing agent can react with the polymerization initiator in order to form a radical that can initiate the polymerization of the above monomers.

The polymerization initiator has the formula (I):

$$(R_fSO_2^-)_xM^{x+} \tag{I}$$

The polymerization initiator is thus a fluorinated sulfinate or polysulfinate compound.

$R_f$ is a fluoroalkyl group comprising from 1 to 3 carbon atoms, preferably 1 or 2 carbon atoms, and more preferably one carbon atom. By "fluoroalkyl group" is meant a group comprising carbon-carbon bonds, at least one carbon-fluorine bond and optionally one or more carbon-hydrogen bonds. According to some preferred embodiments, the fluoroalkyl group can be a perfluoroalkyl group. In other words, the fluoroalkyl group contains only carbon-fluorine and carbon-carbon bonds.

$R_f$ can comprise from 1 to 7 fluorine atoms, preferably from 2 to 7 and more preferably from 3 to 7 fluorine atoms. According to preferred embodiments, $R_f$ can be chosen from a trifluoromethyl group, a pentafluoroethyl group or a heptafluoropropyl group. Even more preferably, $R_f$ is a trifluoromethyl group.

x is an integer from 1 to 4. Preferably x is 1 or 2 and more preferably x is 1.

$M^{x+}$ can thus be chosen from a monovalent cation, or a divalent cation, or a trivalent cation, or a tetravalent cation.

Thus $M^{x+}$ can be chosen from $Li^+$, $Na^+$, $K^+$, $NH_4^+$, $Mg^{2+}$, $Ca^{2+}$, $Zn^{2+}$, $Fe^{2+}$, $Co^{2+}$, $Pb^{2+}$, $Fe^{3+}$, $Al^{3+}$.

Preferably $M^{x+}$ is a monovalent or a divalent cation and more preferably a monovalent cation.

Preferably, $M^+$ is $Na^+$ or $K^+$. In this case, the polymerization initiator of formula (I) is a sodium or potassium sulfinate.

The polymerization initiator may be added at a content from 0.01 to 5 mol % and preferably from 0.1 to 2 mol % relative to the sum of monomers (VDF and/or other monomers as detailed above) to be polymerized. This content may be from 0.01 to 0.1 mol %; or from 0.1 to 0.5 mol %; or from 0.5 to 1 mol %; or from 1 to 1.5 mol %; or from 1.5 to 2 mol %; or from 2 to 2.5 mol %; or from 2.5 to 3 mol %; or from 3 to 3.5 mol %; or from 3.5 to 4 mol %; or from 4 to 4.5 mol %; or from 4.5 to 5 mol %.

The oxidizing agent can be chosen from a peroxide compound, a persulfate compound, dioxygen and a halogen oxide. More particularly, the oxidizing agent can be chosen from ammonium persulfate, potassium persulfate, sodium persulfate, hydrogen peroxide, hydrogen peroxide/urea adduct, tert-butyl peroxide, tert-butyl hydroperoxide, tert-amyl hydroperoxide, bis(tert-butyl cyclohexyl)peroxicarbonate, cumyl peroxide, cumyl hydroxyperoxide, di-isopropylbenzene hydroperoxide, tert-butyl peroxypivalate, tert-butyl peroxide, peracetic acid, iodine pentoxide, sodium percarbonate, potassium percarbonate, ammonium percarbonate, potassium permanganate, sodium bromate, potassium bromate sodium perborate, potassium perborate, molecular iodine, chlorine, bromine and dioxygen. Preferably the oxidizing agent is chosen from ammonium persulfate, potassium persulfate and sodium persulfate.

The oxidizing agent may be added at a content from 0.03 to 5 mol % and preferably from 0.1 to 2 mol % relative to the sum of monomers (VDF and/or other comonomers as detailed above) to be polymerized. This content may be from 0.03 to 0.1 mol %; or from 0.1 to 0.5 mol %; or from 0.5 to 1 mol %; or from 1 to 1.5 mol %; or from 1.5 to 2 mol %; or from 2 to 2.5 mol %; or from 2.5 to 3 mol %; or from 3 to 3.5 mol %; or from 3.5 to 4 mol %; or from 4 to 4.5 mol %; or from 4.5 to 5 mol %.

The molar ratio of the polymerization initiator to the oxidizing agent may be from 0.2 to 5, and preferably from 0.5 to 2. The molar ratio of the polymerization initiator to the oxidizing agent may notably be from 0.2 to 0.5; or from 0.5 to 1; or from 1 to 1.5; or from 1.5 to 2; or from 2 to 2.5; or from 2.5 to 3; or from 3 to 3.5; or from 3.5 to 4; or from 4 to 4.5; or from 4.5 to 5.

Thus, the method according to the present invention comprises a step of putting in contact the abovementioned VDF monomer (and optionally any other comonomer as defined above) with the polymerization initiator and the oxidizing agent.

According to preferred embodiments, the method comprises a first step of putting the oxidizing agent in contact with the polymerization initiator to form a mixture and then a second step of putting this mixture in contact with the VDF monomer (and optionally any other comonomer as defined above). For example, the VDF monomer (and optionally the other comonomers) can be added to this mixture.

The first step can be carried out in the presence of a solvent. The solvent can be chosen from water, acetonitrile, methyl acetate, dimethylcarbonate, propylene carbonate, ethylene carbonate, acetone, cyclohexanone, cyclopentanone dimethylacetamide, N,N-dimethylformamide, N-methyl-2-pyrrolidone, N-formylmorpholine, trimethyl phosphate, triethyl phosphate, hexamethylphosphoramide, dimethyl sulfoxide, N,N'-dimethylpropyleneurea, acetic acid, methyl ethyl ketone or fluorinated solvents such as 1,1,1,3,3-pentafluorobutane, 1-chloro-2,2-difluoroethane and perfluorocyclohexane.

Other compounds, such as a co-solvent in case of mono or biphasic polymerizations, a wax, a non-fluorinated surfactant (sodium dodecyl sulfate or SDS, cetyl ammonium halide, poly(acrylic acid), Triton™ X-100, Triton™ N-101, Triton™ X-114, Triton™ X-405, Triton™ X-45, TWEEN® 20, TWEEN® 40, TWEEN® 60, TWEEN® 65, TWEEN® 80, TWEEN® 85, Span® 20, Span® 60, Span® 65, Span® 80, Span® 85, Brij® 58, Brij® O10, BRIJ® O20, Brij® L4, Brij® S 100, Brij® L23, Brij® 93, Brij® C10, Brij® S20), in order to increase stability or regulate pH.

In some alternative embodiments, the monomers can be transferred to a reactor, then the abovementioned oxidizing agent can be introduced (preferably together with a solvent as described above) and then the polymerization initiator can be further transferred (preferably together with a solvent as described above), after which the reactor can be heated.

In some alternative embodiments, the oxidizing agent can be transferred to a reactor (preferably together with a solvent as described above), then the polymerization initiator (preferably together with a solvent as described above) can be transferred, after which the reactor is heated to the desired temperature, and the monomers can be introduced.

In some alternative embodiments, the oxidizing agent can be transferred to a reactor (preferably together with a solvent as described above), then the monomers can be introduced, and then the polymerization initiator (preferably together with a solvent as described above) can be gradually introduced after heating the reactor to the desired temperature.

In some alternative embodiments, the polymerization initiator can be transferred to a reactor (preferably together with a solvent as described above), then the monomers can be introduced, and then the oxidizing agent (preferably together with a solvent as described above) can be gradually introduced after heating the reactor to the desired temperature.

The method of the present invention may preferably be carried out without surfactants such as ammonium perfluorooctanoate (APFO), perfluorooctanoic acid (PFOA), perfluorooctanesulfonic acid (PFOS), ammonium 4,8-dioxa-3H-perfluorononanoate (ADONA® commercialized by Dyneon), POLYFOX® produced by Omnova, TIVADA® marketed by Merck, and GenX (having the formula $C_3F_7OCF(CF_3)CO_2H$) commercialized by Chemours. More preferably, the method is carried out in the absence of any surfactant.

The polymerization reaction can preferably be performed at a temperature from 30 to 90° C., more preferably from 40 to 80° C. and even more preferably from 50 to 75° C. The temperature may remain constant for a period of time ranging from 1 minute to 5 hours, and preferably from 10 minutes to 3 hours, in order to complete the polymerization reaction. In some embodiments, the monomers may be introduced into the reactor at ambient temperature. In other embodiments, they may be introduced at a lower temperature, for instance from −196° C. to 0° C. Different introduction temperatures may be used for the different monomers. The temperature during the second addition may be higher, or lower (and preferably lower) than the temperature during the first addition. For example, the first addition may be carried out at a temperature from −50 to 0° C., then the temperature can decrease in order to reach a temperature from −196 to −50° C. It goes without saying that the same applies in case more than two additions are carried out. The temperature may then be raised to the desired polymerization reaction temperature.

According to some embodiments, and in case comonomers other than the VDF monomers are used, all monomers are put in contact with the oxidizing agent and the polymerization initiator simultaneously. For example, all monomers are added simultaneously in the mixture comprising the oxidizing agent and the polymerization initiator.

Alternatively, and in case comonomers other than the VDF monomer are used, each type of comonomers is added separately into the mixture comprising the oxidizing agent and the polymerization initiator. For example, a first type of comonomers (HFP monomers for example) can first be added to the mixture, followed by the addition of a second type of monomers (VDF monomers). Alternatively, some type of monomers (for example HFP and PMVE monomers) can be added simultaneously to the mixture comprising the oxidizing agent and the polymerization initiator, followed by the addition of VDF monomers.

Alternatively, a given monomer (such as VDF) may be added to the mixture at two or more points in time, or continuously over a certain period of time.

The oxidizing agent can react with the polymerization initiator to produce sulfur dioxide and a fluorinated radical ($R_f°$ radical as detailed above, and preferably a $CF_3°$ radical). The fluorinated radical can then react with the monomers present in the mixture to initiate polymerization. The polymerization may end when the formed polymer (notably one of the two extremities of the formed polymer) reacts with the fluorinated radical or with a chain transfer agent (such as the solvent).

The method according to the present invention can be carried out under a pressure ranging from 10 to 50 bars.

Preferably, the method according to the present invention may be carried out under inert atmosphere for example under nitrogen or argon atmosphere.

In addition, the method according to the present invention can be carried out in a solution, a suspension or an emulsion.

The method according to the present invention can be carried out in an autoclave. Alternatively, the radical polymerizations can be performed in thick borosilicate Carius tubes (by way of exemplary dimensions: length=130 mm, internal diameter=10 mm, thickness=2.5 mm, total volume=8 mL). For example, the different reactants including the oxidizing agent, the polymerization initiator and optionally the solvent can be added in the tube. The tubes may then be degassed by at least four thaw-freeze cycles, and the required amount of the monomers may then be transferred via a special manifold from an intermediate cylinder from which the drop of pressure was beforehand calibrated with the amount (in g) of the gaseous monomer. The tubes can be sealed under dynamic vacuum at the temperature of liquid nitrogen. Then, they may be inserted in a custom designed heated and shaken apparatus regulated at the desired temperature. The polymerization reaction may then be carried out for the desired period at constant temperature (such as from 40 to 100° C., and preferably from 50-75° C.).

According to some embodiments, the method according to the invention may comprise one or more purification steps. Such steps include common purification methods for the skilled person, such as washing, precipitation, filtering, drying and the like.

Fluorinated Polymer

The polymer obtained according to the above method, comprises units derived from VDF monomers (VDF units) and optionally units derived from one or more other comonomers other than VDF monomer (and as described above). The fluorinated polymer of the present invention partially comprises a terminal group $R_f$ (this group deriving from the polymerization initiator and being as described above). More specifically, the polymer obtained according to the above method has a statistical distribution with at least a part of the polymers of the statistical distribution comprising at least one terminal group $R_f$. The polymers of the statistical distribution may for example comprise two identical terminal groups $R_f$ (for example two $CF_3$ groups) or a first terminal group $R_f$ (for example a $CF_3$ group) and a second terminal group other than the first $R_f$ group which can be a $CF_2H$ group. In case the second terminal group is a group other than the first $R_f$ group, it can be formed for example after a hydrogen transfer from the medium (for example the solvent) to the fluorinated polymer.

The fluorinated polymer may have a molar ratio of $R_f$ groups to terminal groups other than a R terminal groups from 5 to 100%, and preferably from 40 to 100%

The fluorinated polymer may have a number-average molecular weight Mn equal to or higher than 10 000 g/mol, preferably equal to or higher than 20 000 g/mol, and more preferably from 30 000 to 50 000 g/mol. For example, the fluorinated polymer may have a molecular weight from 10 000 to 15 000 g/mol; or from 15 000 to 20 000 g/mol; or from 20 000 to 25 000 g/mol; or from 25 000 to 30 000 g/mol; or from 30 000 to 35 000 g/mol; or from 35 000 to 40 000 g/mol; or from 40 000 to 45 000 g/mol; or from 45 000 to 50 000 g/mol; or from 50 000 to 55 000 g/mol; or from 55 000 to 60 000 g/mol; or from 60 000 to 65 000 g/mol; or from 65 000 to 70 000 g/mol; or from 70 000 to 75 000 g/mol; or from 75 000 to 80 000 g/mol. The molecular weight of the fluorinated polymer is measured by $^{19}F$ NMR spectroscopy.

According to some embodiments, the fluorinated polymer of the present invention is a homopolymer comprising units deriving from VDF monomers.

According to other embodiments, the fluorinated polymer of the present invention is a copolymer comprising units deriving from VDF monomers and units derived from other monomers as detailed above such as HFP, PMVE, TrFE, TFE, TFP, CTFE, BrTFE, ITFE, HFO-1234yf, HFO-1234ze, PPVE, CFE, MAF, hexafluorobutadiene and HFIB monomers.

According to preferred embodiments, in case the fluorinated polymer is a copolymer, it can be a P(VDF-co-HFP) copolymer, or a P(VDF-co-PMVE) copolymer, or a P(VDF-ter-HFP-ter-PMVE) copolymer, or a P(VDF-co-TFE) copolymer, or a P(VDF-co-TrFE) copolymer or a P(VDF-co-CTFE) copolymer or a P(VDF-co-BrTFE) copolymer or a P(VDF-co-ITFE) copolymer or P(VDF-co-HFIB) copolymer, P(VDF-co-PPVE) copolymer, P(VDF-ter-HFP-ter-CTFE) terpolymer or P(VDF-ter-HFP-ter-TrFE) terpolymer or P(VDF-ter-TrFE-ter-CTFE) terpolymer, or P(VDF-ter-TrFE-ter-CFE) terpolymer or P(VDF-ter-HFP-ter-BrTFE) terpolymer, or P(VDF-ter-TrFE-ter-PPVE) terpolymer or P(VDF-ter-TrFE-ter-PMVE) terpolymer, or P(VDF-ter-TrFE-ter-MAF) terpolymer or P(VDF-ter-TrFE-ter-HFIB) terpolymer, or P(VDF-ter-TrFE-ter-1234ze) terpolymer or P(VDF-ter-TrFE-ter-1234yf) terpolymer In case the fluorinated polymer is a copolymer, the content of units deriving from VDF monomers may be from 40 to 99%, and preferably from 50 to 90% by weight relative to the total weight of the polymer. For example, this content may be from 40 to 45%; or from 45 to 50%; or from 50 to 55%; or from 55 to 60%; or from 60 to 65%; or from 65 to 70%; or from 70 to 75%; or from 75 to 80%; or from 80 or 85%; or from 85 to 90%; or from 90 to 95%; or from 95 to 99% by weight relative to the total weight of the polymer. This content can be measured by $^{19}F$ NMR spectroscopy.

Consequently, in case the fluorinated polymer is a copolymer, the content of units deriving from monomers other than the VDF monomers may be from 1 to 50%, and preferably from 40 to 50% by mole. For example, this content may be from 1 to 5%; or from 5 to 10%; or from 10 to 15%; or from 15 to 20%; or from 20 to 25%; or from 25 to 30%; or from 30 to 35%; or from 35 to 40%; or from 40 or 45%; or from 45 to 50%; or from 50 to 55%; or from 55 to 60% by mole. This content may concern one or more than one types of monomers other than the VDF monomers.

The fluorinated polymer according to the present invention may have a degree of crystallinity equal to or lower than 50%, preferably from 10 to 50%, and more preferably from 20 to 45%. The crystallinity is measured by differential scanning calorimetry (DSC) using DSC200 F3 Maia system, from Netzsch. It corresponds to the percentage ratio $\Delta H_m/\Delta H_c$ wherein $\Delta H_c=104.5$ J·g$^{-1}$ corresponds to the enthalpy of fusion of a 100% crystalline PVDF and $\Delta H_m$ is the enthalpy of fusion determined by DSC in J·g$^{-1}$.

The fluorinated polymer according to the present invention may have a degradation temperature equal to or higher than 200° C., preferably equal to or higher than 250° C., and more preferably equal to or higher than 300° C. By "degradation temperature" is meant the temperature at which the polymer loses 5% of its weight due to degradation. The degradation temperature can be measured by a thermogravimetric analysis (TGA) using Q50 equipment from TA Instruments.

EXAMPLE

The following example illustrates the invention without limiting it.

Tests A to F are according to the invention and tests G and H are comparative tests.

Potassium trifluoromethyl sulfinate (CF$_3$SO$_2$K) was used as a polymerization initiator.

Ammonium persulfate (APS) was used as an oxidizing agent.

Ammonium perfluorooctanoate (APFO) was used as a surfactant in a 30 wt % aqueous solution.

All tests were carried out under nitrogen atmosphere.

| Tests | A (inv) | B (inv) | C (inv) | D (inv) | E (inv) | F (inv) | G (comp) | H (comp) |
|---|---|---|---|---|---|---|---|---|
| VDF (g) | 7 | 5 | 5 | 5 | 7 | 7 | 7 | 7 |
| HFP (g) | — | — | 5 | 2 | — | — | — | — |
| PMVE (g) | — | 5 | — | 2 | — | — | — | — |
| $CF_3SO_2K$ (g) | 0.19 | 0.19 | 0.19 | 0.19 | 0.19 | 0.19 | 0.19 | — |
| APS (g) | 0.22 | 0.22 | 0.22 | 0.22 | 0.22 | 0.22 | — | 0.22 |
| APFO (mL) | — | — | — | — | — | 0.1 | 0.1 | 0.1 |
| Water (mL) | 20 | 20 | 20 | 20 | 20 | 20 | 20 | 20 |

Figure 2:
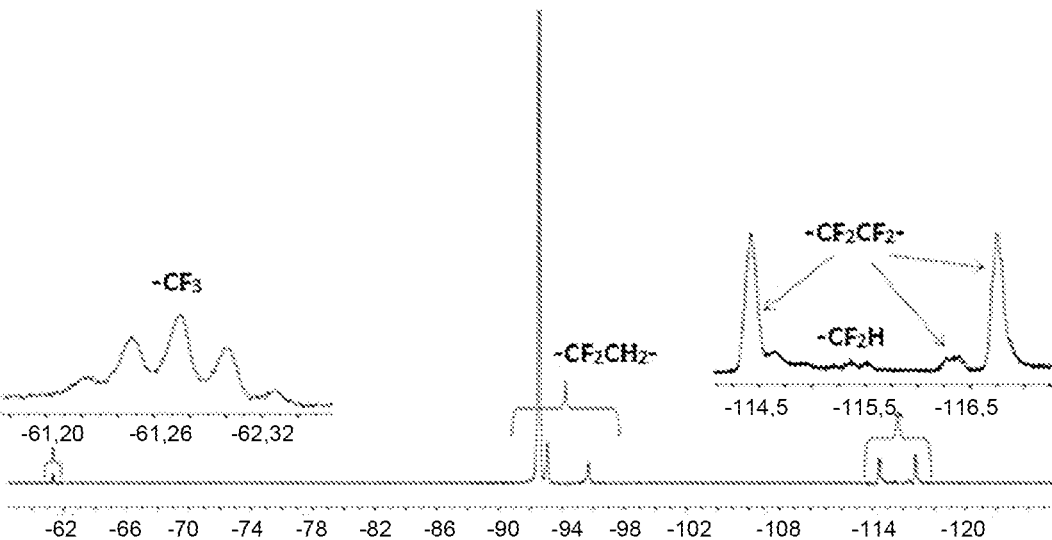
FIGS. 2 to 5 illustrate $^{19}F$ NMR spectra of different VDF-containing (co)polymers according to the invention.

Test A:

The polymerization of VDF was performed from a purged solution comprising APS, $CF_3SO_2K$, and water which was transferred into a vacuumed autoclave. The reactor was then cooled to ca. $-100°$ C., and VDF gas were transferred (nAPS/nVDF=0.009 (0.9 mol %), $nCF_3SO_2K$/nVDF=0.01 (1 mol %)). Subsequently, the autoclave was warmed up to room temperature and then gradually heated to 60° C., while the reaction solution was mechanically stirred vigorously. After 1.5 hours, the pressure in the autoclave dropped from 34 to 6 bars. The autoclave was then cooled, immersed in a water-ice bath, then depressurized, and opened to air. The VDF conversion was 100%. The reaction product was transferred to a beaker and the autoclave was washed with water to remove all the solids. The product was filtered using a Buchner apparatus and then washed with water. A small amount of acetone was added to the solid and the product was left to dry at 60° C. under vacuum ($10^{-3}$ bar) overnight. The final product was recovered as a white powder (yield 100%, 100% fluorinated end groups, 60% $CF_3$ and 40% $CF_2H$ end groups). The obtained polymer has a degradation temperature of 430° C., a melting point of 159° C., a crystallization temperature of 129° C. and a degree of crystallinity of 44%. The polymer had an average molecular weight Mn of 10 250 g/mol. Its $^{19}F$ NMR spectrum is illustrated in FIG. 2 (recorded with a Bruker 400 MHz, in dimethylhydrophosphite/DMSO-$d_6$(4/1)).

Figure 3:
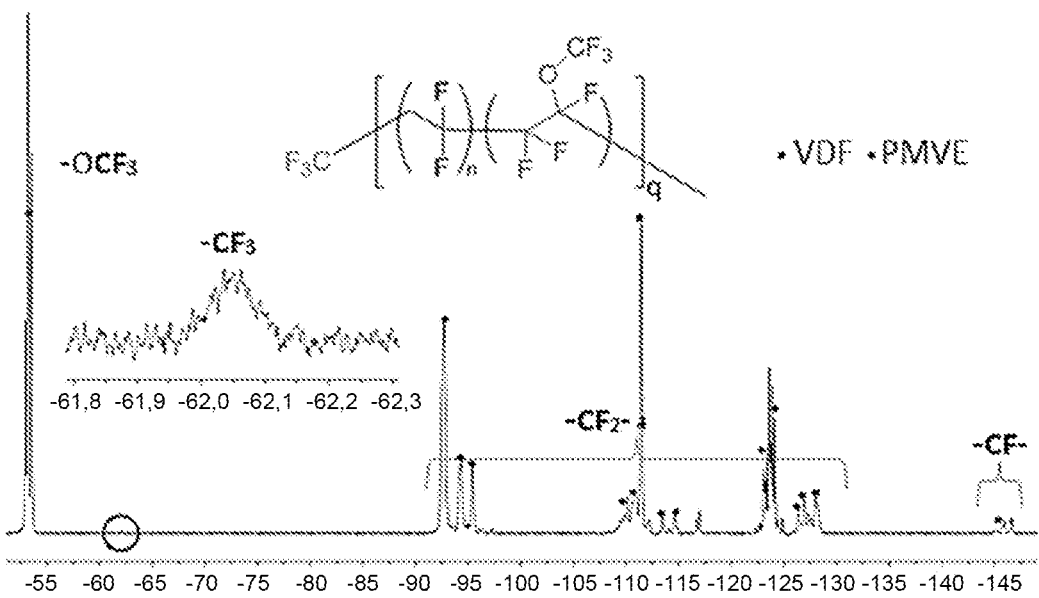

Test B:

The copolymerization of VDF with PMVE was carried out from a purged solution comprising APS, $CF_3SO_2K$ and water which was transferred into a vacuumed autoclave. The reactor was then cooled, first PMVE was introduced and then VDF was added (nAPS/(nVDF+nPMVE)=0.0089 (0.89 mol %), $nCF_3SO_2K$/(nVDF+nPMVE)=0.0095 (0.95 mol %), $nVDF_0$/$nPMVE_0$=2.6/1.0 (70%/30%)). Subsequently, the autoclave was warmed up to room temperature and then to 60° C., while the reactor was mechanically stirred vigorously. After 3 hours, the pressure in the autoclave dropped from 29 to 6 bars. The autoclave was then cooled in a water-ice bath, depressurized by venting, and opened to air (conversion of (VDF/PMVE) mixture was 95%). The reaction product was transferred to a beaker and the autoclave was washed with water to remove all the solids. The product was filtered using a Buchner apparatus and then washed with water. A small amount of acetone was added to the solid and the product was left to dry at 60° C. under vacuum ($10^{-3}$ bar) overnight. The final product was recovered as a white gum (yield 94%, % VDF/% PMVE=74/26 this proportion being measured by $^{19}F$ NMR). The obtained polymer has a degradation temperature of 409° C., a glass transition temperature of $-29°$ C., The polymer had an average molecular weight Mn of 35 600 g/mol. Its $^{19}F$ NMR spectrum is illustrated in FIG. 3 (recorded with a Bruker 400 MHz, in acetone-$d_6$.

Figure 4:
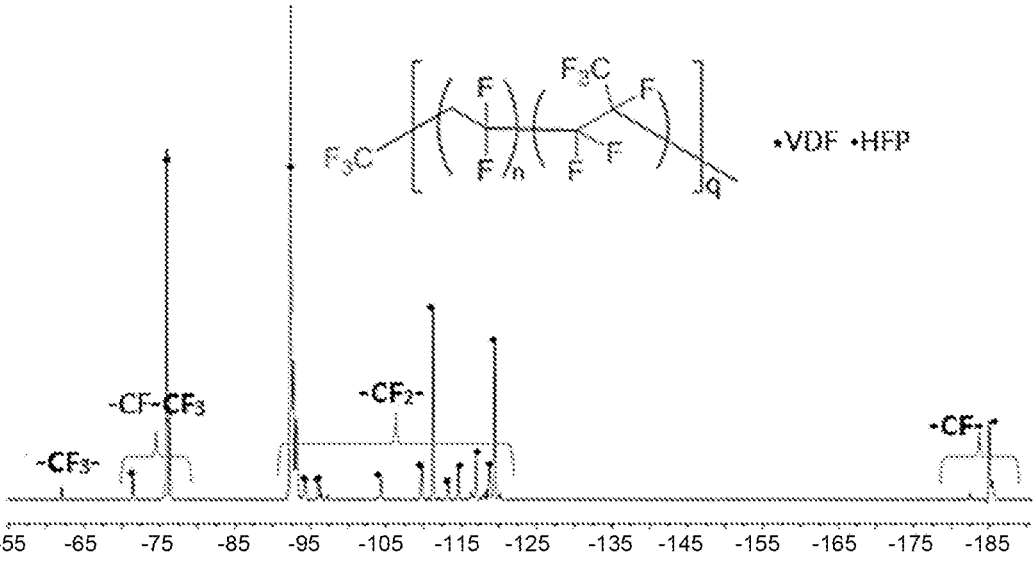

Test C:

The copolymerization of VDF with HFP was performed from a purged solution comprising APS, $CF_3SO_2K$ and water which was transferred into a vacuumed autoclave. The reactor was then cooled, first HFP was introduced and then VDF was added at a temperature $-100°$ C., nAPS/(nVDF+nHFP)=0.0092 (0.92 mol %), $nCF_3SO_2K$/(nVDF+nHFP)= 0.01 (1 mol %), $nVDF_0$/$nHFP_0$=3.1/1 (75 mol %/25 mol %)). Subsequently, the autoclave was warmed up to room temperature and then to 60° C., while the reactor was mechanically stirred vigorously. After 3 hours, the pressure in the autoclave dropped from 31 to 5 bars. The autoclave was then cooled in a water-ice bath, depressurized by venting, and opened to air (conversion of (VDF/HFP) mixture=100%). The reaction product was transferred to a beaker and the autoclave was washed with water to remove all the solids. The product was filtered using a Buchner apparatus and then washed with water. A small amount of acetone was added to the solid and the product was left to dry at 60° C. under vacuum ($10^{-3}$ bar) overnight. The final product was recovered as a white gum (yield 100%, % VDF/% HFP=86/14 this proportion being measured by $^{19}F$ NMR). The obtained polymer has a degradation temperature of 407° C., a glass transition temperature of $-26°$ C., a melting point of 95.6° C. and a crystallization temperature of 43.8° C. The polymer had an average molecular weight Mn of 16 500 g/mol. Its $^{19}F$ NMR spectrum is illustrated in FIG. 4 (recorded with a Bruker 400 MHz, in acetone-$d_6$).

Figure 5:
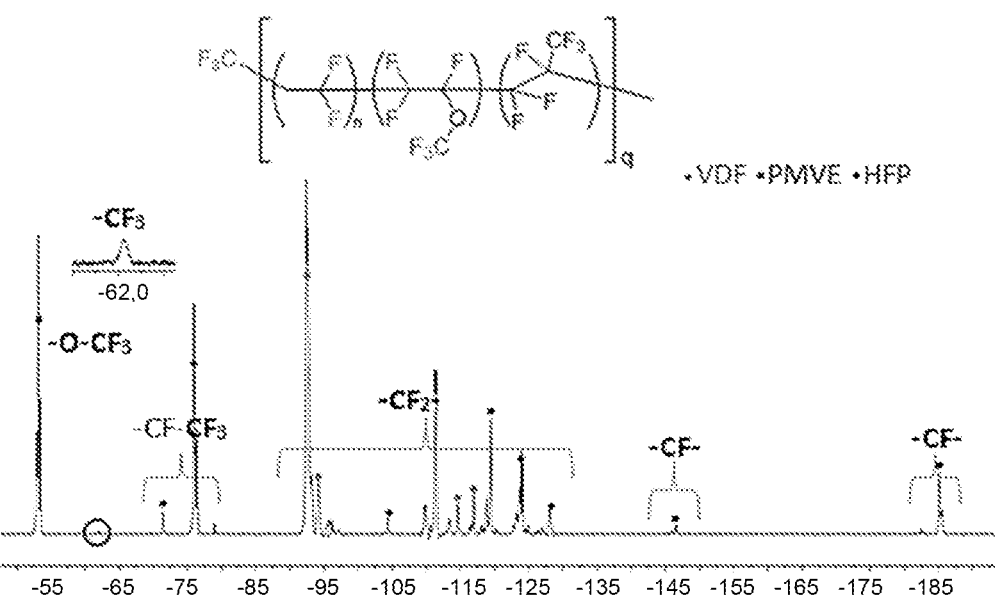

Test D:

The terpolymerization of VDF with HFP and PMVE was performed from a purged solution comprising APS, $CF_3SO_2K$ and water which was transferred into a vacuumed autoclave. The reactor was then cooled, HFP and PMVE were introduced and then VDF was introduced at ca. $-100°$ C. (nAPS/(nVDF+nHFP+nPMVE)=0.0093 (0.93 mol %), $nCF_3SO_2K$/(nVDF+nHFP+nPMVE)=0.01 (1 mol %), % $VDF_0$+% $HFP_0$+% $PMVE_0$=76/13/11). The autoclave was warmed up to room temperature and then gradually heated to 60° C., while the reaction solution was mechanically stirred vigorously. After 3 hours, the pressure in the autoclave was reduced from 30 to 6 bar. The autoclave was thencooled, immersed in a water-ice bath, then depressurized by venting, and opened to air. (conversion of (VDF/PMVE/IFP) mixture was 91%) The reaction product was transferred to a beaker and the autoclave was washed with water to remove all the solids. The product was filtered using a Buchner apparatus and then washed with water. A small amount of acetone was added to the solid and the product was left to dry at 60° C. under vacuum ($10^{-3}$ bar) overnight. The final product was recovered as a white gum (yield 89%, % VDF+% HFP+% PMVE=74/13/13 this proportion being measured by $^{19}F$ NMR) The obtained polymer has a degradation temperature of 409° C., and a glass transition temperature of $-24°$ C. The polymer had an average molecular weight Mn of 40 000 g/mol calculated with $^{19}$F NMR. Its $^{19}$F NMR spectrum is illustrated in FIG. 5 (recorded with a Bruker 400 MHz, in acetone-d$_6$).

Test E:

The polymerization of VDF was performed from a purged solution comprising APS, $CF_3SO_2K$, and water which was transferred into a vacuumed autoclave. The reactor was then cooled, and VDF gas were transferred (APS/$CF_3SO_2K$=1.5/1)). Subsequently, the autoclave was warmed up to room temperature and then gradually heated to 80° C., while the reaction solution was mechanically stirred vigorously. After 15 minutes, the pressure dropped to 1 bar and a full conversion of the monomer was achieved (VDF conversion=100%). The autoclave was then cooled, immersed in a water-ice bath, then depressurized, and opened to air (no unreacted VDF escaped). The reaction product was transferred to a beaker and the autoclave was washed with water to remove all the solids. The product was filtered using a Buchner apparatus and then washed with water. A small amount of acetone was added to the solid and the product was left to dry at 60° C. under vacuum (10$^{-3}$ bar) overnight. The final product was recovered as a white powder (yield 100%). The obtained polymer had an average molecular weight Mn of 4 600 g/mol. The polymer had a ratio of terminal $CF_3$ groups to terminal $CH_2OH$ groups of 85/15 and head to head VDF content of 1.9%.

Test F:

The polymerization of VDF was performed from a purged mixture comprising APS, water, $CF_3SO_2K$ and APFO which was transferred into a vacuumed autoclave. The reactor was then cooled and VDF gas was transferred (APS/$CF_3SO_2K$=1.5/1)). Subsequently, the autoclave was warmed up to room temperature and then gradually heated to 80° C., while the reaction solution was mechanically stirred under high stirring. A full conversion of the monomers was achieved. The autoclave was then cooled, immersed in a water-ice bath, then depressurized, and opened to air (VDF conversion=100%). The reaction product was transferred to a beaker and the autoclave was washed with water to remove all the solids. The product was filtered using a Buchner apparatus and then washed with water. A small amount of acetone was added to the solid and the product was left to dry at 60° C. under vacuum (10$^{-3}$ bar) overnight. The final product was recovered as a white powder (Yield 100%). The obtained polymer had an average molecular weight Mn of 3 000 g/mol. The polymer had a ratio of terminal $CF_3$ groups to terminal $CH_2OH$ groups of 40/60 and head to head VDF content of 1.2%.

Test G:

The polymerization of VDF was performed from a purged mixture comprising $CF_3SO_2K$ (nCF$_3$SO$_2$K/nVDF=0.01 (1 mol %)) water and APFO which was transferred into a vacuumed autoclave. The reactor was then cooled ca. −100° C., and VDF gas was transferred. Subsequently, the autoclave was warmed up to room temperature and then gradually heated to 80° C., while the reaction solution was mechanically stirred at high stirring. After 3 hours, the pressure was constant at 33 bars. The reactor was then cooled, immersed in a water-ice bath, then depressurized, and opened to air. 7 g of gas were released and neither solids nor emulsions were present, and no product was isolated.

Test H:

The polymerization of VDF was performed from a purged mixture comprising APS, water and APFO which was transferred into a vacuumed autoclave. The reactor was then cooled, and VDF gas was transferred (nAPS/nVDF=0.01 (1 mol %)). Subsequently, the autoclave was warmed up to room temperature and then gradually heated to 80° C., while the reaction solution was mechanically stirred at high stirring. After 15 minutes, the pressure dropped from 33 to 4 bars. It was then cooled, immersed in a water-ice bath, then depressurized, and opened to air. VDF conversion was 100%. The reaction product was transferred to a beaker and the autoclave was washed with water to remove the entire product. The emulsion was concentrated using a rotary evaporator and then left to dry at 60° C. under vacuum (10$^{-3}$ bar) overnight. The final product was recovered as a white powder (yield=100%). The obtained polymer had a degradation temperature of 315° C. and an average molecular weight Mn of 7 000 g/mol, degree of crystallinity=43%, a melting point of 164° C. and a crystallization temperature of 128° C.

Remarks:

According to tests A to F, it can be concluded that the polymerization process of the present invention makes it possible to obtain a trifluoromethyl-terminated polymer comprising VDF units and also HFP and/or PMVE units. Such (co)polymers present a relatively high degradation temperature.

In test F, APFO was used as a surfactant. However, according to tests A and E (without APFO), the polymerization can successfully be carried out in the absence of surfactant. More particularly, when comparing tests E and F, it can be concluded that the $CF_3$ end-chain proportion increased from 40% (test F) to 85% (test E), and the average molecular weight Mn of the polymer formed also increased from 3 000 g/mol (test F) to 4 600 g/mol (test E).

Comparative test G indicates that in the absence of an oxidizing agent, the polymerization process could not be carried out.

Comparative test H (polymerization in the absence of $CF_3SO_2K$) led to a polymer comprising oxygenated groups.

The degradation temperature (temperature of 5 wt % loss (T$_{5\%}$)) of polymers obtained according to the process of tests A to D and F was measured using Q50 equipment from TA Instruments. About 10 mg of sample was heated to 500° C., at a 10° C./min rate under 40 mL/min of N$_2$. Data were analyzed at TA Universal Analysis 2000 software.

The degree of crystallinity, the crystallization temperature (the summit of peak in the cooling thermogram), the glass transition temperature (the inflexion point in the heat capacity jump), and the melting point (summit of the peak in the heating thermogram) were measured by differential scanning calorimetry (DSC) using DSC200 F3 Maia system, from Netzsch.

The head to head ratio and the ratio of terminal $CF_3$ groups to terminal $CH_2OH$ groups of 85/15 were measured by $^{19}$F NMR spectroscopy.

The TGA thermograms (under nitrogen atmosphere) illustrated in FIG. 1 show a comparison between test A and comparative test H. More particularly, the TGA thermograms show that the $CF_3$-terminated PVDF (test A) has better thermal stability than PVDF initiated by APS (test H). The 5% weight loss of the polymer of test H occurred at 315° C. while the 5% weight loss of the polymer of test A occurred at 427° C. showing an increase of the thermal resistance by 112° C.

Figure 6:
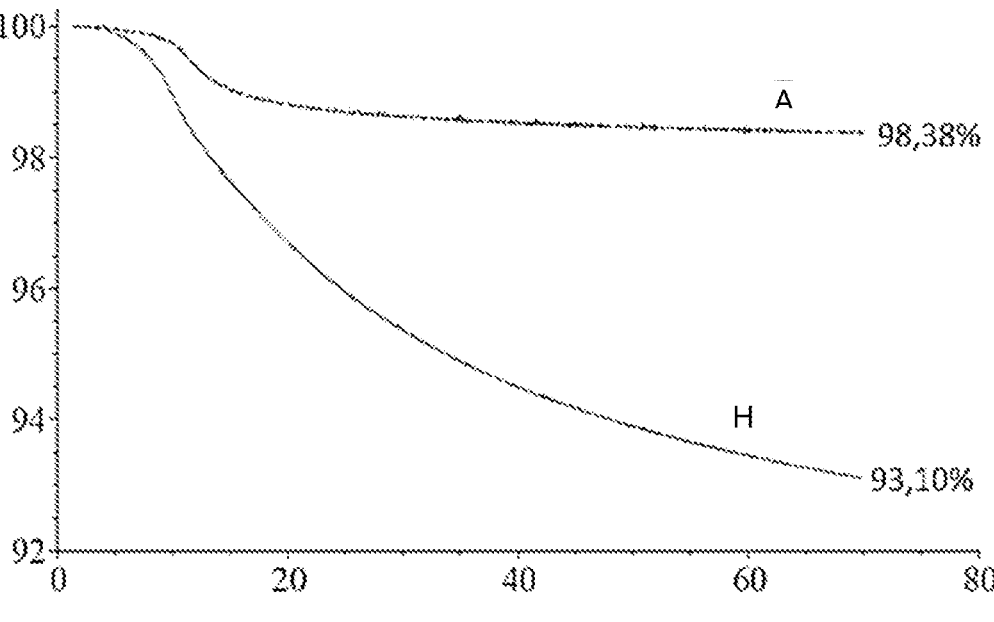
FIG. 6 illustrates two TGA thermograms. The weight of the polymer (%) can be read on the Y-axis and the time (min) can be read on the X-axis.

The TGA thermograms (under air and at constant temperature) illustrated in FIG. 6 show a comparison between test A and comparative test H. In fact, once more these thermograms show that the $CF_3$-terminated PVDF (test A) has better thermal stability than PVDF initiated by APS (test H). More particularly, after 1 hour at 260° C., the weight loss for the polymer of test H is 6.90% while the weight loss for the polymer of test A is 1.62%, which indicates a better thermal stability for the polymer according to the invention.

The invention claimed is:

1. A method of polymerizing at least one monomer comprising a vinylidene fluoride monomer, the method comprising putting in contact the at least one monomer with a polymerization initiator and an oxidizing agent, the polymerization initiator having the formula (I):

$$(R_f SO_2^-)_x M^{x+} \qquad (I)$$

wherein:

$R_f$ is a fluoroalkyl group comprising from 1 to 3 carbon atoms; and $M^{x+}$ comprises a monovalent cation, a divalent cation, a trivalent cation, or a tetravalent cation, wherein the method is carried out in the absence of a surfactant.

2. The method according to claim 1, wherein $R_f$ is a fluoroalkyl group comprising one carbon atom.

3. The method according to claim 1, wherein $M^{x+}$ is chosen from $Li^+$, $Na^+$, $K^+$, $NH_4^+$, $Mg^{2+}$, $Ca^{2+}$, $Zn^{2+}$, $Fe^{2+}$, $Co^{2+}$, $Pb^{2+}$, $Fe^{3+}$ and $Al^{3+}$.

4. The method according to claim 1, wherein x is 1 or 2.

5. The method according to claim 1, wherein the oxidizing agent is chosen from a peroxide compound, a persulfate compound, dioxygen and a halogen oxide.

6. The method according to claim 1, wherein the at least one monomer further comprises at least one comonomer chosen from: a fluorinated comonomer other than vinylidene fluoride comprising an ethylene bond, a styrene comonomer, a methacrylic comonomer, an acrylic comonomer and combinations thereof.

7. The method according to claim 6, wherein the fluorinated comonomer other than vinylidene fluoride comprising an ethylene bond is chosen from: trifluoroethylene, vinyl fluoride, tetrafluoroethylene, hexafluoropropylene, hexafluorobutadiene, chlorotrifluoroethylene, bromotrifluoroethylene, perfluoropropylvinylether, perfluoromethylvinylether, 2,3,3,3-tetrafluoropropene, 2-trifluoromethacrylic acid, alkyl 2-trifluoromethacrylate, $\alpha,\beta$-difluoroacrylic acid, alkyl $\alpha$, $\beta$-difluoroacrylate, $\beta,\beta$-difluoroacrylic acid, alkyl $\beta,\beta$-difluoroacrylate, $\alpha,\beta,\beta$-trifluoroacrylic acid, alkyl $\alpha,\beta$, $\beta$-trifluoroacrylate, 1,1,1-trifluoro-2-trifluoromethyl-prop-2-ene, perfluorobutadiene and their combinations.

8. The method according to claim 1, comprising a first step of putting the oxidizing agent in contact with the polymerization initiator to form a mixture and a second step of putting this mixture in contact with the monomer(s).

9. The method according to claim 1, wherein the polymerization is carried out at a temperature from 40 to 100° C.

10. The method according to claim 1, wherein $R_f$ is a trifluoromethyl group.

11. The method according to claim 1, wherein $M^{x+}$ is chosen from $Li^+$, $Na^+$, $K^+$ and $NH_4^+$.

12. The method according to claim 1, wherein x is 1.

13. The method according to claim 1, wherein the oxidizing agent is a persulfate compound chosen from ammonium persulfate, potassium persulfate and sodium persulfate.

14. The method according to claim 1, wherein the polymerization is carried out at a temperature from 50 to 75° C.

* * * * *